United States Patent
Stoffels et al.

(10) Patent No.: US 12,257,661 B2
(45) Date of Patent: Mar. 25, 2025

(54) MEASURING SLEEVE FOR TOOL MEASUREMENT

(71) Applicant: Franz Haimer Maschinenbau KG, Hollenbach-Igenhausen (DE)

(72) Inventors: Olaf Stoffels, Verl (DE); Shakeel Nisar, Bielefeld (DE); Franz Ziegltrum, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 18/607,774

(22) Filed: Mar. 18, 2024

(65) Prior Publication Data
US 2024/0308014 A1 Sep. 19, 2024

(30) Foreign Application Priority Data
Mar. 17, 2023 (DE) ...................... 10 2023 106 799.0

(51) Int. Cl.
| | |
|---|---|
| *B23Q 17/09* | (2006.01) |
| *B23Q 17/24* | (2006.01) |
| *G01B 11/04* | (2006.01) |
| *G01B 21/04* | (2006.01) |

(52) U.S. Cl.
CPC .... *B23Q 17/0923* (2013.01); *B23Q 2717/006* (2013.01)

(58) Field of Classification Search
CPC .......... B23Q 17/0923; B23Q 2717/006; B23B 2231/2045; G01B 11/043; G01B 21/047
See application file for complete search history.

(56) References Cited

U.S. PATENT DOCUMENTS

| | | | | |
|---|---|---|---|---|
| 1,463,176 A | * | 7/1923 | Schieldge | ........... B23B 31/2073 |
| | | | | 279/147 |
| 6,701,597 B2 | * | 3/2004 | Voss | ................... B23Q 17/2225 |
| | | | | 408/239 R |

FOREIGN PATENT DOCUMENTS

| | | |
|---|---|---|
| DE | 10317576 A1 | 11/2004 |
| WO | WO-2004091854 A1 * 10/2004 | ............ B23P 11/027 |

OTHER PUBLICATIONS

Franz Haimer; WO2004091854A1 Device for Fixing a Rotational Tool to a Tool Holder; EPO English Machine Translation; pp. 1-3 (Year: 2004).*

* cited by examiner

*Primary Examiner* — Bayan Salone
(74) *Attorney, Agent, or Firm* — Laurence A. Greenberg; Werner H. Stemer; Ralph E. Locher

(57) ABSTRACT

A measuring sleeve for measuring a tool, a tool presetting device, a method for measuring a tool by means of a tool presetting device and to a method for mounting a tool in a tool holder. The measuring sleeve for measuring a tool provides a base body, particularly in the form of a sleeve, with a recess which runs starting from a first end side of the measuring sleeve in the axial direction of the measuring sleeve and has cross sections, in particular circular cross sections, decreasing in steps for receiving a tool to be measured.

15 Claims, 4 Drawing Sheets

MEASURING SLEEVE FOR TOOL MEASUREMENT

CROSS-REFERENCE TO RELATED APPLICATION

This application claims the priority, under 35 U.S.C. § 119, of German Patent Application DE 10 2023 106 799.0, filed Mar. 17, 2023; the prior application is herewith incorporated by reference in its entirety.

FIELD AND BACKGROUND OF THE INVENTION

The invention relates to a measuring sleeve for measuring a tool, to a tool presetting device, to a method for measuring a tool by means of a tool presetting device and to a method for mounting a tool in a tool holder.

It is known to clamp tools, such as rotating tools, in particular milling or boring tools, in predetermined setpoint positions in tool holders in which the tool has, or is intended to have, a particular (axial) projection length in relation to the tool holder.

For this purpose, knowledge of the (exact) axial length of the tool is helpful or necessary.

Various methods and apparatuses for measuring tools, in particular for measuring an axial length of a tool, are known in the prior art.

For example, DE 103 17 576 A1 describes a length measuring module with the aid of which the (axial) length of a rotating tool can be measured (before clamping). The length measuring tool for this purpose has a measuring stand with a mechanical measuring element that can be displaced on a guide.

SUMMARY OF THE INVENTION

It is an object of the invention to specify a method and/or an apparatus with which a tool, in particular its axial length, can be measured straightforwardly and economically.

This object is achieved by a measuring sleeve for measuring a tool, by a tool presetting device, by a method for measuring a tool by means of a tool presetting device and by a method for mounting a tool in a tool holder, having the features of the respective independent claim.

Advantageous developments of the invention are the subject of dependent claims and of the following description—and relate both to the measuring sleeve and the tool presetting device and also to the methods.

Terms which may be used, such as up, down, front, rear, left or right are—unless otherwise explicitly defined—to be understood according to their usual meaning—including with regard to the present figures. Terms such as radial and axial, if used and not otherwise explicitly defined, are to be understood in relation to midaxes or symmetry axes of parts/components described here—including with regard to the present figures.

The term "substantially"—if used—may (according to the interpretation of the Supreme Court) be understood as meaning "an extent which is still significant in practice". This terminology thus implies that possible deviations from exactitude may occur without intent (i.e. without a functional reason) due to manufacturing or mounting tolerances or the like.

"Measuring (a tool)" may be understood as meaning that at least one item of geometrical information of the tool is acquired by the measurement process. In particular, an axial length of a tool may in this case be measured. Diameters, radii and the like may also be measured on a tool.

A tool to be measured may in this case mean a machining tool, in particular a rotationally symmetrical machining tool or rotating tool, in particular a milling tool (or a boring tool) or a tool suitable or used for milling or a turning tool. Particular tools which are used for turning may also be measured.

The measuring sleeve for measuring a tool (reference sleeve/universal measuring sleeve) provides a base body, particularly in the form of a sleeve, with a recess which runs starting from a first end side of the measuring sleeve in the axial direction of the measuring sleeve and has cross sections, in particular circular cross sections, decreasing in steps for receiving a tool to be measured.

Expressed simply and illustratively, the stepped recess (in the measuring sleeve) provided for receiving a tool to be measured becomes increasingly narrow "from the top downward" (in steps) so that smaller-diameter tools to be measured are inserted further downward into the recess—as far as "their" step—than larger-diameter tools. "Their step" means the step whose cross section is slightly larger than the diameter of the tool to be measured. The cross section of the recess step lying directly below said "their step" would be just too small to receive the tool to be measured here.

It is in this case found to be expedient, particularly in terms of manufacturing technology—and including with regard to rotating tools—for the recess to be configured substantially in the form of a circular disk in the region of a step with the same cross section.

Furthermore, the cross sections of the recess steps, which in particular are in the form of circular disks, may be determined and/or adapted according to diameters of tools, and this may in particular ensure that tools to be measured that are received in the recess have little susceptibility to tilting.

According to one particular expedient embodiment, the recess steps, which in particular are in the form of circular disks, are respectively arranged concentrically with a midaxis of the measuring sleeve. Expressed simply and illustratively, the recess in this case forms an inverted right stepped cone.

It is furthermore found to be particularly expedient in this case for the measuring sleeve to be configured with a transmission slit that extends in particular radially through the measuring sleeve and/or in particular runs through a midaxis of the measuring sleeve and extends starting from the first end side of the measuring sleeve at least over the region of the recess which is in particular arranged concentrically with a midaxis in the measuring sleeve.

Thus, if the transmission slit is irradiated/illuminated, or radiated/shone through, with a radiation medium, for example light, for example of an optical measuring system in a presetting device, it is thereby possible to determine in particular where a tool to be measured is positioned in the measuring sleeve, or in the recess there. In particular, a lower end side of the tool to be measured which is positioned in the recess may thus be determined (during the measurement of the tool).

According to the invention, the recess steps, which in particular are in the form of circular disks, may also respectively be arranged displaced off-center with respect to a midaxis of the measuring sleeve in such a way that the recess steps form a common surface line and/or the midaxes of the recess steps lie in a common plane.

Expressed simply and illustratively, (while the recess forms a right stepped cone in the case of the aforementioned recess steps concentric with the midaxis of the measuring sleeve) in this case the recess forms an inverted oblique stepped cone.

The recess achieves a shape and location (in the measuring sleeve) which are particularly expedient—in terms of manufacturing and application technology—if the recess steps, which in particular are in the form of circular disks, are respectively arranged displaced off-center with respect to a midaxis of the measuring sleeve in such a way that the common surface line is arranged parallel to the midaxis of the measuring sleeve, wherein a distance between the common surface line and the midaxis is in particular substantially equal to a distance between the midaxis of the measuring sleeve and a surface line of the measuring sleeve which is parallel to the common surface line.

It is furthermore found to be particularly expedient in this case for the measuring sleeve furthermore to be configured with material removal, which is in particular integrally removable, which material removal extends starting from the first end side of the measuring sleeve in the axial direction of the measuring sleeve at least over the region of the recess and is configured in such a way that the recess steps are not fully enclosed by measuring sleeve material in the circumferential direction after material has been removed.

In contrast to the aforementioned measuring sleeve with the aforementioned right stepped cone, for a measuring sleeve with the aforementioned oblique stepped cone and the described material removal, it may be found to be advantageous that—particularly in the case of (rotating) tools to be measured which are small (in diameter/length)—they can be removed again more easily from the recess of the measuring sleeve because they are more readily accessible owing to the cone shape or shape of the recess and the aforementioned material removal or in combination with the aforementioned material removal (i.e. free accessibility from the outside to the places of the material removal at the recess steps or at the recess step which is not enclosed by measuring sleeve material) than those in the recess in the case of the right stepped cone. In the latter case, (rotating) tools to be measured which are small (in diameter/length) may possibly be inserted so far into the recess that they can sometimes no longer be gripped from above.

In a (functionally) similar way to the aforementioned transmission slit (in the case of the aforementioned right stepped cone in the measuring sleeve), here again—if the measuring sleeve (which receives a tool to be measured) is irradiated/illuminated, in the region of its material removal with a radiation medium, for example light, for example of an optical measuring system in a presetting device—it is thus possible to determine where a tool to be measured is positioned in the measuring sleeve, or in the recess there. In particular, a lower end side of the tool to be measured which is positioned in the recess may thus here again be determined (during the measurement of the tool).

In particular—in order to ensure secure "seating" of a tool to be measured in the recess, or to prevent tilting of a tool to be measured, it is found to be expedient in this case for that region of a recess step which is not enclosed by measuring sleeve material to be a circular disk sector with a midpoint angle of less than 180°, particularly less than 150°, particularly less than 130°, particularly in a range of [30°, 180°], [30°, 150°], [30°, 130°], [45°, 180°], [45°, 150°] or [45°, 130°], and/or for the material removal, which is in particular integrally removable, to be removed with an inclination at an angle of about 5° in relation to the midline of the measuring sleeve.

Furthermore, it may also be expedient for the measuring sleeve to be made of metal, in particular noncorroding steel, in particular case-hardened steel or stainless steel. Nonmetallic materials may also be used. For example, the measuring sleeve may be made from a thermoplastic material, such as polyoxymethylene (POM)—or other expedient materials. Optionally, the measuring sleeve may also be coated.

The measuring sleeve may in particular be cylindrical, or it may optionally also be polygonal.

The tool presetting device provides the aforementioned measuring sleeve.

According to one development, it may in this case be expedient for the aforementioned tool presetting device to be a combined presetting and shrinking device.

This makes it possible that tools can be measured by means of the optical measuring system of the tool presetting device—in the tool presetting device—(without other measuring devices and/or measurement locations being required for this purpose). These measurement results from this tool measurement are then also available to results from a presetting (in the presetting device).

According to one development of the embodiment, it is thus expedient in particular for the presetting device to have a measuring system, in particular an optical measuring system and/or a mechanical measuring system, and a selectable position location for the measuring sleeve, this location being selectable in such a way that the recess of a measuring sleeve positioned at the selectable position location can be acquired by the measuring system, which is optionally movable in a measurement range, and in particular can be focused by the optical measuring system.

It is also found to be particularly expedient for the position location for the measuring sleeve to be in the region of or close to or in the immediate vicinity of a spindle in the presetting device.

In the method for measuring a tool by means of the aforementioned tool presetting device (with an optical measuring system for measuring tools and the aforementioned measuring sleeve), a tool arranged in the measuring sleeve, or in the recess of the measuring sleeve, is measured using the optical measuring system.

It has been found to be expedient that the measuring sleeve is positioned at a selectable position location in the tool presetting device, the tool to be measured is positioned in the recess of the measuring sleeve, the optical measuring system of the tool presetting device is optionally moved into a measurement position in which the recess of the measuring sleeve can be focused, and the tool positioned in the recess of the measuring sleeve is focused and measured using the optical measuring system.

The measurement of the tool may be performed by successively acquiring shaft ends and tips (or vice versa) of the tool with the measuring system and calculating the length of the tool from the two positions.

Preferably, however, the positions of the individual recess steps may be determined beforehand and stored in a data memory. In this case, it is sufficient only to measure the tip of the tool with the measuring system when measuring the tool.

In the method for mounting a tool in a tool holder, a tool is measured by the aforementioned method, in particular an axial tool length of the tool is measured, an abutment element in the tool holder is positioned using the measurement result, in particular the axial length, the tool is introduced into the tool holder until it abuts on the abutment element, and the tool is fastened in the introduced position in the tool holder.

Here, it is found to be particularly expedient for the mounting method to be carried out in a combined tool presetting and shrinking device.

It is to be understood that the aforementioned apparatus and the aforementioned methods may be used for any tool holders, thus in particular for shrinking mounts, but also collet chucks and hydraulic expansion chucks.

The description provided so far of advantageous configurations of the invention contains numerous features which are sometimes reproduced with several being combined together in the individual dependent claims. These features may, however, also expediently be considered individually and combined to form suitable further combinations.

Even though some terms in the description or in the patent claims are used in the singular or in combination with a number, the scope of the invention is not intended to be restricted to the singular or the respective number for these terms. Furthermore, the words "a" or "an" are to be understood not as numbers but as indefinite articles.

The above-described properties, features and advantages of the invention, and also the way in which they are achieved, will become clearer and more easily understandable in conjunction with the following description of the exemplary embodiments of the invention, which will be explained in more detail in connection with the drawings/figures (components/component parts and functions that are the same have identical reference signs in the drawings/figures).

The exemplary embodiments serve to explain the invention and do not restrict the invention to combinations of features specified therein or else in relation to functional features. Moreover, suitable features of any exemplary embodiment may also be explicitly considered in isolation, removed from an exemplary embodiment, introduced into another exemplary embodiment in order to supplement the latter and combined with any of the claims.

Other features which are considered as characteristic for the invention are set forth in the appended claims.

Although the invention is illustrated and described herein as embodied in a measuring sleeve for tool measurement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Tool Presetting with Tool Length Measurement (FIGS. 1 to 4)

Figure 1:
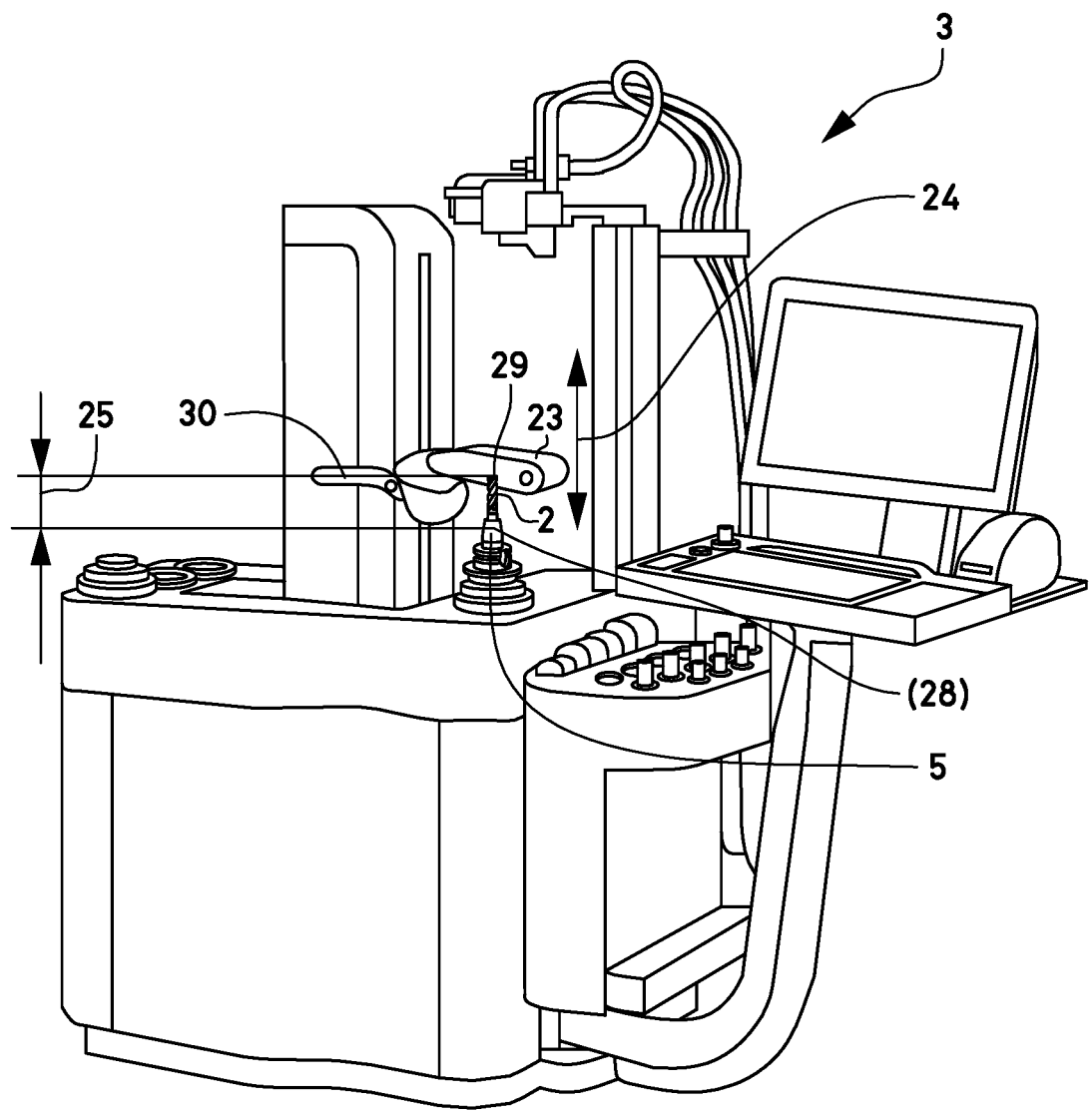
FIG. 1 shows a combined presetting and shrinking device with a measuring sleeve for measuring a tool according to one embodiment.
Figure 2:
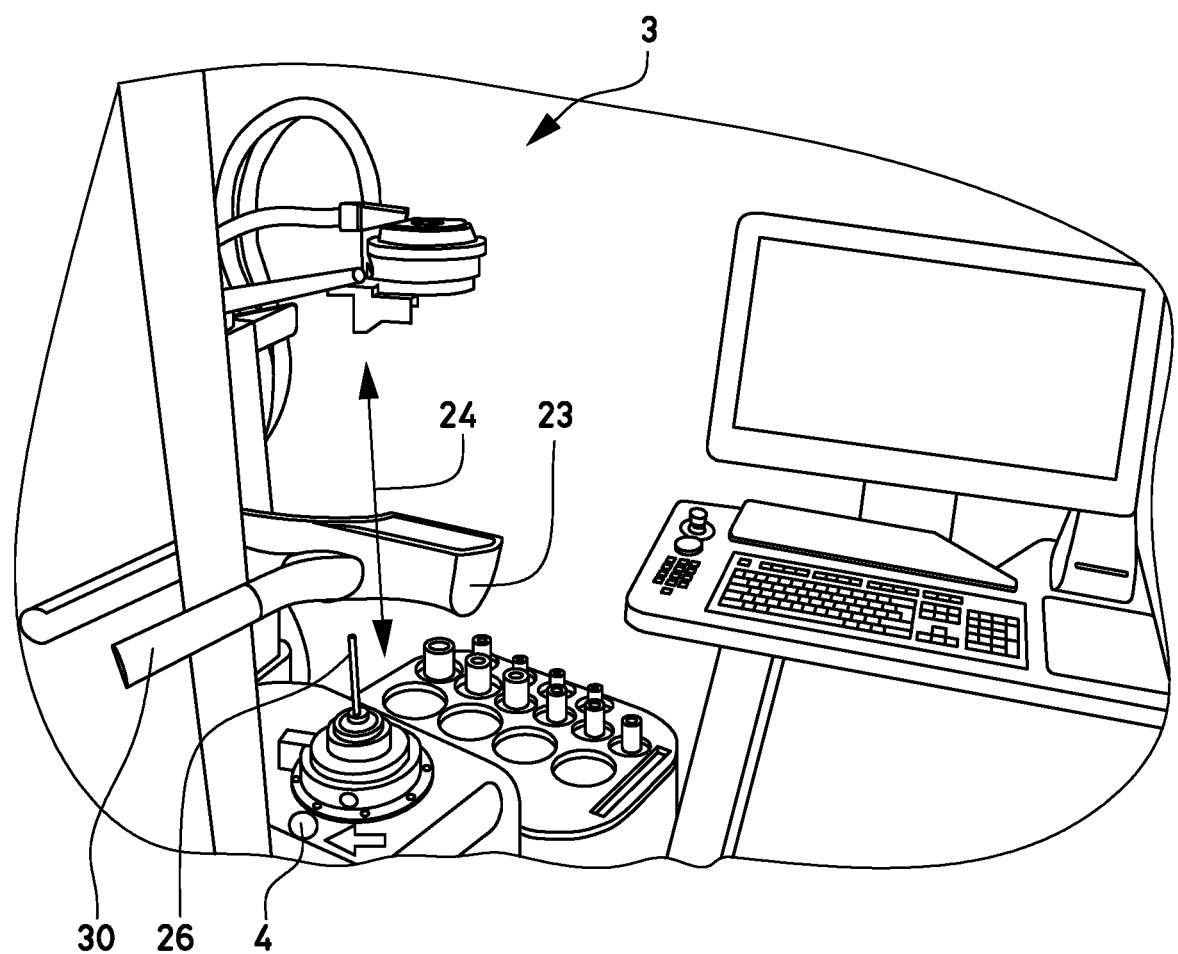
FIG. 2 shows a detailed section of the combined presetting and shrinking device according to FIG. 1—with an illustration of a suitable position for the measuring sleeve.
Figure 3A:
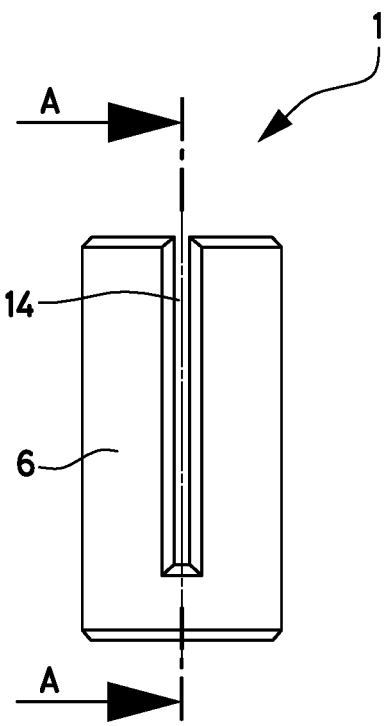
FIG. 3 shows a measuring sleeve for measuring a tool according to one embodiment (FIGS. 3a to 3e)
Figure 3B:
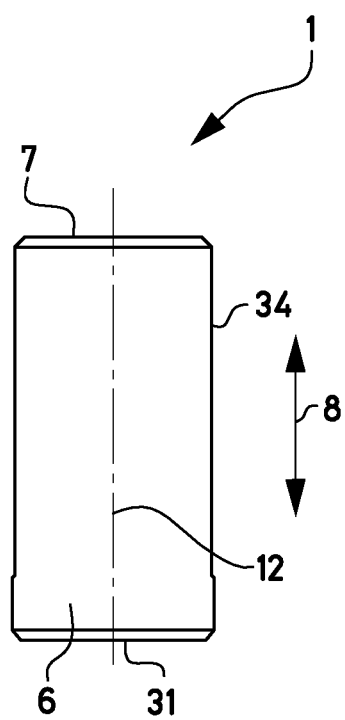
Figure 3C:
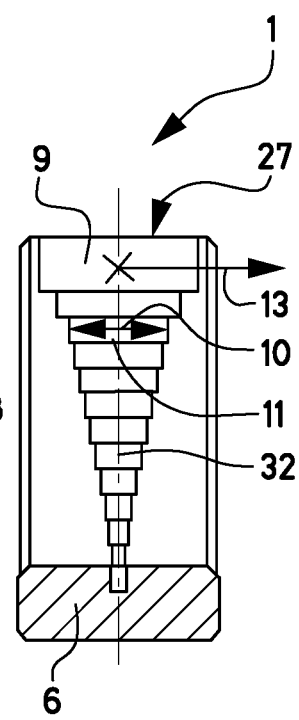
Figure 3D:
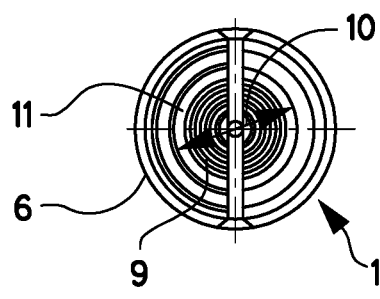
Figure 3E:
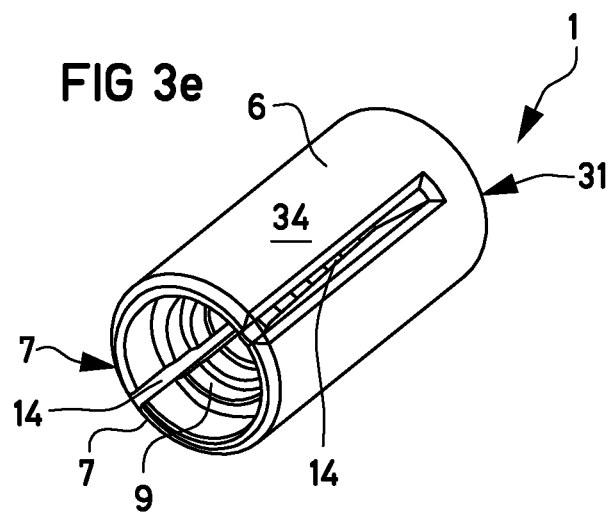
Figure 4:
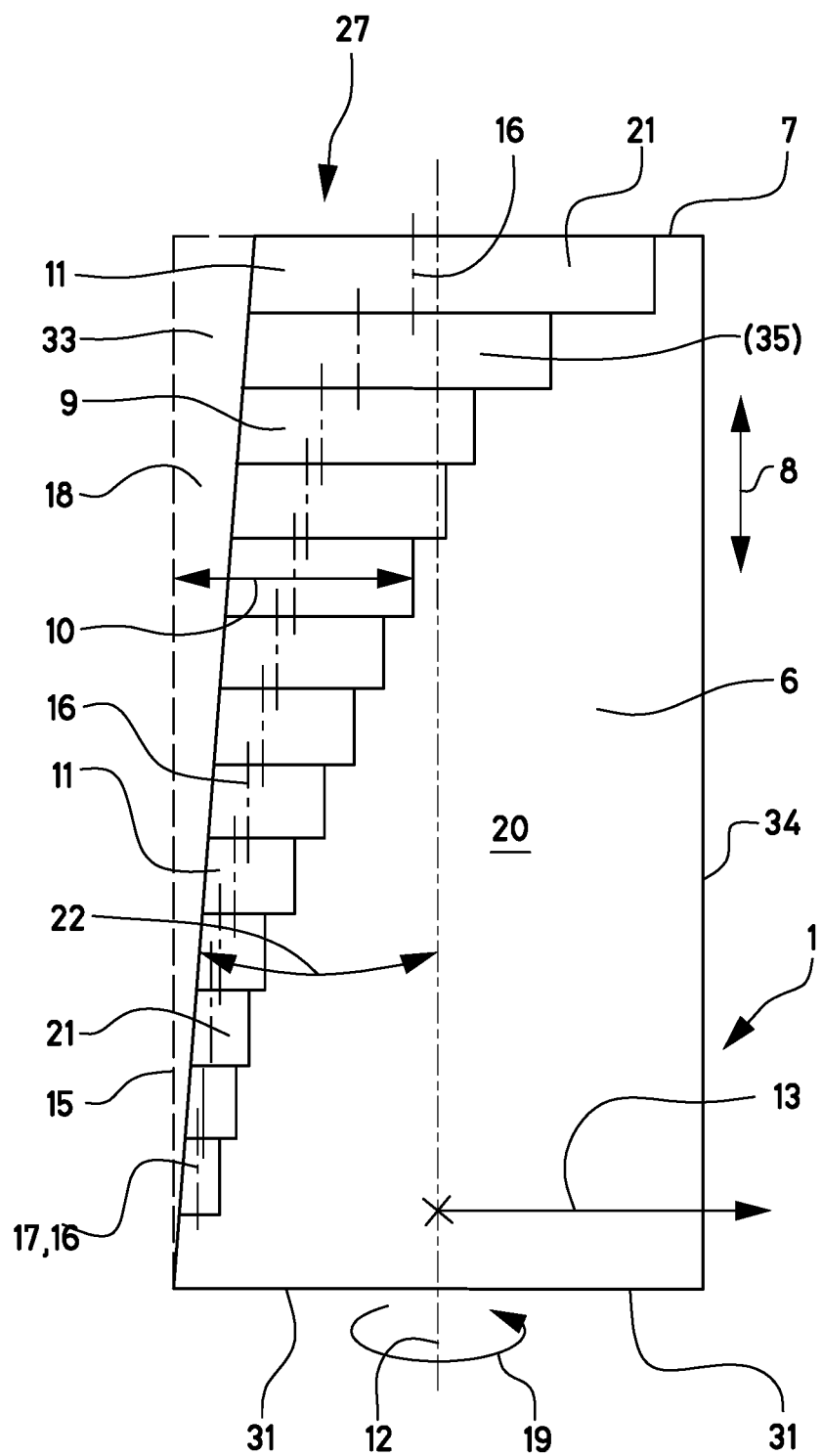
FIG. 4 shows (in section) a measuring sleeve for measuring a tool according to a further embodiment.

FIG. 1 shows a combined presetting and shrinking device 3. FIG. 2 shows a detailed section of the combined presetting and shrinking device 3—with an illustration of a suitable position 4 of a measuring sleeve 1 for a measurement of a tool 2 in the presetting and shrinking device 3. FIGS. 3 and 4 show various embodiments of such a measuring sleeve 1 for measuring a tool 2.

FIG. 1 shows the combined presetting and shrinking device 3, as—in its basic functions of "presetting" and "shrinking"—is conventional (and known) (for example from: https://www.haimer.de/produkte/voreinstelltechnik/voreinstellgeraete-der-vio-baureihe/vio-linear-tool-shrink.html, available there on 02.07.2023).

This combined presetting and shrinking device 3 (abbreviated below to just "presetting device 3" for simplicity) provides as a further function (of the presetting device 3) a tool measurement in which (for example before a presetting and/or shrinking of a tool 2 into a tool mount 5 by the presetting device 3) a measurement of the tool 2 may be carried out-using the aforementioned measuring sleeve 1.

In this measurement, the axial length 25 of a tool 2, in this case a rotating tool 2 such as a milling tool, is measured- and the measured axial length 25 of the tool 2 is subsequently used in the presetting or in the shrinking (of the measured tool 1 in a tool mount 5)

The measuring device 23 which carries out this measurement is, as shown by FIG. 1 and in particular FIG. 2, the optical measuring device 23 that the presetting device 3 in any case already provides and which carries out the presetting (or relevant measurement on a tool 2) in the presetting device 3.

In order to measure a (rotating) tool 2, or a milling tool 2, or to determine its axial length 25, as illustrated by FIG. 2 a or the aforementioned (in this case metallic) measuring sleeve 1 (cf. FIGS. 3 and 4), using which the measurement by means of the measuring device 23 of the presetting device 3 is carried out, is placed at a position 4 that lies in a measurement range 24 and can be approached by the measuring device 23 of the presetting device 3—specifically in such a way that an opening 27 of a recess 9 in the measuring sleeve 1 points upward.

During the measurement, the (rotating) tool 2 to be measured is then introduced/inserted into the recess 9 of the measuring sleeve 1—specifically with its shaft-side end face 28 downward.

The (rotating) tool 2 to be measured is in this case inserted into the recess 9 until its shaft-side end face 28 comes to lie on a step 11—described in more detail below—in the recess 9—and is thus not inserted further into the recess 9. Depending on the insertion depth of the (rotating) tool 2 to be measured and its axial length 25—the cutting-side end face 29 of the (rotating) tool 2 to be measured may—or may not-protrude upward beyond the measuring sleeve 1.

Expressed simply, the (rotating) tool 2 to be measured may or may not project out of the recess 9 of the measuring sleeve 1.

During the measurement of the (rotating) tool 2, or the measurement of its axial length 25, the measurement system 23 is then displaced—by means of its carrier system 30—toward the measuring sleeve 1 in such a way that the measurement field of the measuring system 23 can acquire the measuring sleeve 1 with the (rotating) tool 2 positioned in the measuring sleeve 1, or its recess 9, and can thus (in this case optically) measure or determine at least its axial position.

If the configuration of the measuring sleeve 1, as will be described below with the aid of FIGS. 3 and 4, provides that the shaft-side end side 28 of the (rotating) tool 2 to be measured can be (optically) acquired by the measuring system 23—because it is at least partially exposed—, and also that the cutting-side end side 29 of the (rotating) tool 2 to be measured can likewise be (optically) acquired by the measuring system—because it too is at least partially exposed—, the measuring system 23 can determine the axial length 25 of the (rotating) tool 2 to be measured—from its two axial ends 28, 29 that can be acquired in this way.

The measurement value, i.e. the (axial) length 25 of the (rotating) tool 1 to be measured, is stored—in the presetting device 3—, displayed there, and is available elsewhere via an interface that the presetting device 3 provides.

If—for example by means of shrinking by the presetting device 3—the (rotating) tool 2 measured (in the aforementioned way) is intended to be shrunk into the tool holder 5—in a predetermined setpoint position in which the (rotating) tool 2 is intended to have a particular (axial) projection length in relation to a tool mount 5 clamping/holding the (rotating) tool 2—an abutment element 26 provided, in this case a pin 26 (cf. FIG. 2), may be positioned in the tool holder 5—in accordance with the measurement result or the axial length 25.

The (rotating) tool 2 is then introduced into the tool holder 5 until it abuts on the abutment element 26 or the pin 26—and is thus then shrunk in the introduced position in the tool holder 5.

Measuring Sleeve—with Central Recess (FIG. 3 or FIGS. 3*a* to 3*e*)

FIG. 3 (comprising FIGS. 3*a* to 3*e*) shows a measuring sleeve 1 such as may be used for the aforementioned measurement of a (rotating) tool 2 to be measured, or in the aforementioned presetting device 3.

As shown by FIG. 3, the measuring sleeve 1, formed as a sleeve-shaped or cylindrical (metallic) base body 6, provides a stepped (axially running) recess 9 (in the measuring sleeve 1), of which the recess steps 11 in the form of circular disks each with the same diameter/cross section 10 are respectively arranged concentrically with the midaxis 12 of the measuring sleeve 1.

Expressed simply and illustratively, the recess 9 in this case forms an inverted right (axial) stepped cone 32—configured concentrically in the measuring sleeve 1—which— starting from/at the (first) upper end side 7 of the measuring sleeve 1—reaches (inside the measuring sleeve 1) close to the (second) lower end side 31 of the measuring sleeve 1.

As is furthermore shown by FIG. 3, the measuring sleeve 1 furthermore provides a transmission slit 14 which extends radially 13 through the measuring sleeve 1 and runs through the midaxis 12 of the measuring sleeve 1, and extends starting from the upper end side 7 of the measuring sleeve 1 in an axial direction 8 of the measuring sleeve over the region of the recess 9.

If (in the aforementioned measurement of the (rotating) tool 2 to be measured by the presetting device 3 or the (optical) measuring system 23) a transmission slit 14 is irradiated/illuminated, or radiated/shone through, by a radiation medium, in this case light, of the optical measuring system 23 of the presetting device 3, it is thereby possible to determine in particular where the tool 2 to be measured is positioned in the measuring sleeve 1, or in the recess 9 there.

In particular the lower, shaft-side end side 28 or the lower end 28 of the (rotating) tool 2 to be measured positioned in the recess 9 (and also the upper, cutting-side end side 29 or the upper end 29 of the (rotating) tool 2 to be measured) may be determined (during the measurement of the tool 2). The two axial ends 28, 29 of the measured (rotating) tool 2 then provide its axial length 25.

Measuring Sleeve—with Open, Off-Center Recess (FIG. 4)

FIG. 4 shows (schematically in section) a further measuring sleeve 1 such as may also be used in the aforementioned measurement of a (rotating) tool 2 to be measured, or in the aforementioned presetting device 3.

As illustrated by FIG. 4 in this case, the measuring sleeve 1, again likewise formed as the sleeve-shaped or cylindrical (metallic) base body 6, likewise provides a stepped (axially running) recess 9 (in the measuring sleeve 1), of which the recess steps 11 again in the form of circular disks each with the same diameter/cross section 10—in this case—are arranged displaced off-center with respect to the midaxis 12 of the measuring sleeve 1 in such a way that the recess steps 11 form a common surface line 15, wherein the midaxes 16 of the recess steps 11 in the form of circular disks also lie in a common plane and the common surface line 15 is arranged parallel to the midaxis 12 of the measuring sleeve 1 and touches a (parallel, axial) surface line 17 of the measuring sleeve 1.

Expressed simply and illustratively, (while—in the case of the aforementioned circular recess steps 11 concentric with the midaxis 12 of the measuring sleeve 1—the recess 9 forms a right stepped cone 32 (cf. FIG. 3)) in this case the recess 9 forms an inverted oblique (axial) stepped cone 33 which touches the lateral surface 34 of the measuring sleeve 1 (internally, linearly) and likewise—starting from/at the upper end side 7 of the measuring sleeve 1—again reaches (inside the measuring sleeve 1) close to the lower end side 31 of the measuring sleeve 1.

As is furthermore illustrated by FIG. 4, the measuring sleeve 1 in this case provides an integrally removable material removal 18 running at an inclination with respect to the midaxis 12 of the measuring sleeve 1, which (again) extends starting from the first end side 7 of the measuring sleeve 1 in the axial direction 8 of the measuring sleeve 1 over the region of the recess 9—and is configured in such a way that the recess steps 11 are not fully enclosed by measuring sleeve material 20 in the circumferential direction 19 after material 18 has been removed (i.e. (expressed illustratively and simply) they are cut free).

The angle of inclination 22 (intermediate angle 22) which the material removal 18 has with respect to the midaxis 16 of the measuring sleeve 1 is about 5°, so that (cut-free) circular disk sectors 21 with a midpoint angle 35—in this case—of less than about 130° are obtained in the circular recess steps 11.

In a (functionally) similar way to the aforementioned transmission slit 14 (in the case of the aforementioned right stepped cone 32 in the measuring sleeve 1 (cf. FIG. 3)), here again—if the measuring sleeve 1 is irradiated/illuminated in the region of its material removal 18 (by means of the (optical) measuring system 23 of the presetting device 3)—it is possible to determine where the (rotating) tool 2 to be measured is positioned in the measuring sleeve 1, or in the recess 9 there.

In particular the lower end side 28, or the lower end 28 of the (rotating) tool 2 to be measured which is positioned in the recess 9 (and also the upper end side 28 or the upper end 29 of the (rotating) tool 2 to be measured), may thus in this case also be determined (during the measurement of the tool 2). The two axial ends 28, 29 of the measured (rotating) tool 2 then in turn provide its axial length 25.

Although the invention has been illustrated and described in detail using the preferred embodiments, the invention is not restricted by the examples disclosed and other variations may be derived therefrom without departing from the scope of protection of the invention.

The following is a summary list of reference numerals and the corresponding structure used in the above description of the invention:

1 measuring sleeve
2 tool, (rotationally symmetrical) machining tool, milling tool
3 presetting device, (combined) presetting and shrinking device
4 position, (selectable) position location
5 tool holder, tool mount
6 base body
7 first, upper end side (of the measuring sleeve 1)
8 axial direction
9 recess
10 cross section
11 (recess) step
12 midline/midaxis (of the measuring sleeve 1)
13 radial direction
14 transmission slit
15 common surface line (of the recess steps 11)
16 midaxis (of a recess step 11)
17 (parallel) surface line (of the measuring sleeve 1)
18 material removal
19 circumferential direction
20 measuring sleeve material
21 circular disk sector
22 (inclination/intermediate) angle
23 optical measuring system, (optical) measuring device
24 measurement range
25 axial length of a tool 2
26 abutment element, pin
27 opening (of the recess 9)
28 shaft-side lower end side/face or end (of the tool 2)
29 cutting-side, upper end side/face or end (of the tool 2)
30 carrier system (of the measuring system 23)
31 second, lower end side (of the measuring sleeve 1)
32 (inverted right (axial)) stepped cone
33 (inverted oblique (axial)) stepped cone
34 lateral surface (of the measuring sleeve 1)
35 midpoint angle (of a circular disk sector 21)

The invention claimed is:

1. A measuring sleeve for measuring a tool, the measuring sleeve comprising:
   a base body;
   a recess in the base body extending from a first end side of the measuring sleeve in the axial direction of the measuring sleeve; and
   a diameter of the recess decreasing in steps from the first end side in the axial direction to an end side of the recess opposite from the first end side of the measuring sleeve, and the recess being configured for receiving a tool to be measured.

2. The measuring sleeve according to claim 1, wherein the diameter of the recess is substantially circular in a region of the steps.

3. The measuring sleeve according to claim 1, wherein the diameter of the steps of the recess are based on a diameter of tools to be measured.

4. The measuring sleeve according to claim 1, wherein the steps of the recess are respectively arranged concentrically with a mid-axis of the measuring sleeve.

5. The measuring sleeve according to claim 1, further comprising a transmission slit extending radially through the base body measuring sleeve and/or through a mid-axis of the base body of the measuring sleeve; and extending axially from the first end side of the base body of the measuring sleeve at least over the region of the recess.

6. The measuring sleeve according to claim 1, the steps of the recess are respectively arranged displaced off-center with respect to a mid-axis of the measuring sleeve in such a way that the steps of the recess form a common surface line and/or the mid-axes of the recess steps lie in a common plane.

7. The measuring sleeve according to claim 1, wherein the steps of the recess are respectively displaced off-center with respect to a mid-axis of the base body of the measuring sleeve and a common surface line is parallel to the mid-axis of the measuring sleeve; and a distance between the common surface line and the mid-axis is substantially equal to a distance between the mid-axis of the measuring sleeve and a surface line of the measuring sleeve which is parallel to the common surface line.

8. The measuring sleeve according to claim 7, further comprising a material to be removed in the measuring sleeve extending from the first end side of the measuring sleeve in the axial direction of the measuring sleeve at least over the region of the recess; and wherein the recess steps are not fully enclosed by a measuring sleeve material in the circumferential direction after material has been removed.

9. The measuring sleeve according to claim 8, wherein a region of a recess step that is not enclosed by measuring sleeve material is a circular disk sector with a midpoint angle of less than 180°; and/or the material to be removed is removed with an inclination at an angle of about 5° in relation to the midline of the measuring sleeve.

10. A tool presetting device comprising a measuring sleeve according to claim 1.

11. The tool presetting device according to claim 10, further comprising an optical measuring system; a selectable position location for the measuring sleeve; and wherein the position location is selectable such that the recess of the measuring sleeve is positioned at the selectable position location and can be focused by the optical measuring system which is optionally movable in a measurement range.

12. A method for measuring a tool, the method comprising:
   providing a tool presetting device with an optical measuring system for measuring tools and a measuring sleeve according to claim 1;
   arranging a tool in the measuring sleeve or in the recess of the measuring sleeve; and
   measuring the tool using the optical measuring system.

13. The method for measuring a tool according to claim 12, further comprising:
   positioning the measuring sleeve at a selectable position location in the tool presetting device;
   positioning the tool to be measured in the recess of the measuring sleeve; and
   focusing the tool positioned in the recess of the measuring sleeve and measuring the tool using the optical measuring system.

14. The method for measuring a tool according to claim 12, wherein the tool to be measured is a rotationally symmetrical machining tool.

15. A method for mounting a tool in a tool holder, the method comprising:
   measuring the tool according to the method of claim 12;
   positioning an abutment element in the tool holder using a measurement result;
   introducing the tool into the tool holder until it abuts on the abutment element; and fastening the tool in the introduced position in the tool holder.

\* \* \* \* \*